United States Patent
Carney et al.

(10) Patent No.: US 7,605,932 B2
(45) Date of Patent: Oct. 20, 2009

(54) SYSTEM AND METHOD OF IMPLEMENTING A JOB CANCEL BROADCAST NOTIFICATION AND PARALLEL PROCESSING OF THE REQUEST

(75) Inventors: Dennis M. Carney, Louisville, CO (US); Charles D. Johnson, Boulder, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 824 days.

(21) Appl. No.: 11/349,578

(22) Filed: Feb. 8, 2006

(65) Prior Publication Data

US 2007/0182980 A1 Aug. 9, 2007

(51) Int. Cl.
*G06K 15/00* (2006.01)
*G06F 3/12* (2006.01)
(52) U.S. Cl. .................................... 358/1.14; 358/1.15

(58) Field of Classification Search ................ 358/1.14, 358/1.15, 1.13, 1.1, 1.2, 1.6, 1.9, 1.16, 1.17, 358/1.18, 434, 435, 436, 437, 438, 439, 468; 347/2, 3, 5, 14, 23; 399/1, 8; 710/15, 19, 710/62
See application file for complete search history.

(56) References Cited

U.S. PATENT DOCUMENTS

| | | | | |
|---|---|---|---|---|
| 5,978,560 | A * | 11/1999 | Tan et al. | 358/1.15 |
| 6,301,011 | B1 * | 10/2001 | Fung et al. | 358/1.15 |
| 6,327,045 | B1 * | 12/2001 | Teng et al. | 358/1.15 |
| 2002/0080389 | A1 * | 6/2002 | Carney et al. | 358/1.15 |
| 2003/0016385 | A1 * | 1/2003 | Matsumoto et al. | 358/1.15 |
| 2008/0055622 | A1 * | 3/2008 | Reuvers et al. | 358/1.13 |
| 2008/0186529 | A1 * | 8/2008 | Carney et al. | 358/1.15 |

* cited by examiner

*Primary Examiner*—Dov Popovici
(74) *Attorney, Agent, or Firm*—Dillon & Yudell LLP

(57) ABSTRACT

A method, apparatus, and computer-usable medium for registering a collection of components with a job monitor for job cancellation notification, wherein the collection of components are software components within a logical printer domain; receiving a job cancel request; initiating cancellation of a job corresponding to the job cancel request; sending the job cancellation notification to the collection of registered components; and in response to receiving the job cancellation notification, stopping processing of the job and purging data related to the job by the plurality of registered components.

8 Claims, 3 Drawing Sheets

SYSTEM AND METHOD OF IMPLEMENTING A JOB CANCEL BROADCAST NOTIFICATION AND PARALLEL PROCESSING OF THE REQUEST

BACKGROUND OF THE INVENTION

1. Technical Field

The present invention relates in general to the field of data processing systems. More particularly, the present invention relates in general to the interaction between data processing systems and printers. Still more particularly, the present invention relates to a system and method of implementing a job-cancel broadcast notification and parallel processing of the request.

2. Description of the Related Art

Those with skill in the art will appreciate that during interactions between computer systems and printers, a user may want to cancel a print request before the request has been fulfilled. The cancellation of the print request may occur because the operator has found an error in the document to be printed and would like to conserve the paper that would be wasted to the erroneous printout. However, those with skill in the art will also appreciate that when a print request is cancelled, the user may only cancel the part of the request that has not been spooled or queued in internal buffers for processing. Some pages of the cancelled print request might still be printed despite the user's cancellation of the request.

Therefore, there is a need for a system and method for addressing the abovementioned limitations of the prior art.

SUMMARY OF THE INVENTION

The present invention includes a method, apparatus, and computer-usable medium for registering a collection of components with a job monitor for job cancellation notification, wherein the collection of components are software components within a logical printer domain; receiving a job cancel request; initiating cancellation of a job corresponding to said job cancel request; sending the job cancellation notification to the collection of registered components; and in response to receiving the job cancellation notification, stopping processing of the job and purging data related to the job by said plurality of registered components.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

Figure 1:
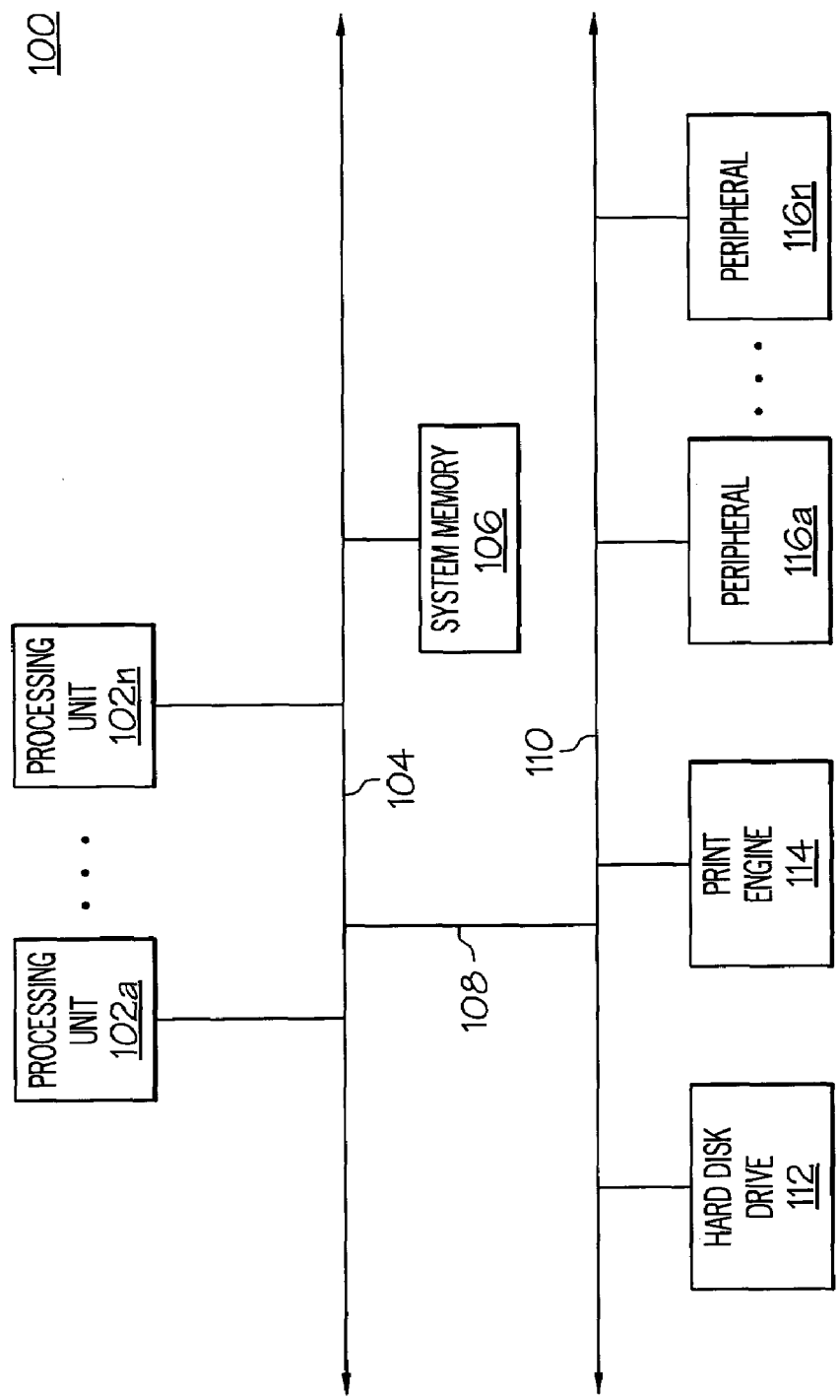
FIG. 1 is a block diagram of an exemplary data processing system in which a preferred embodiment of the present invention may be implemented.
Figure 2:
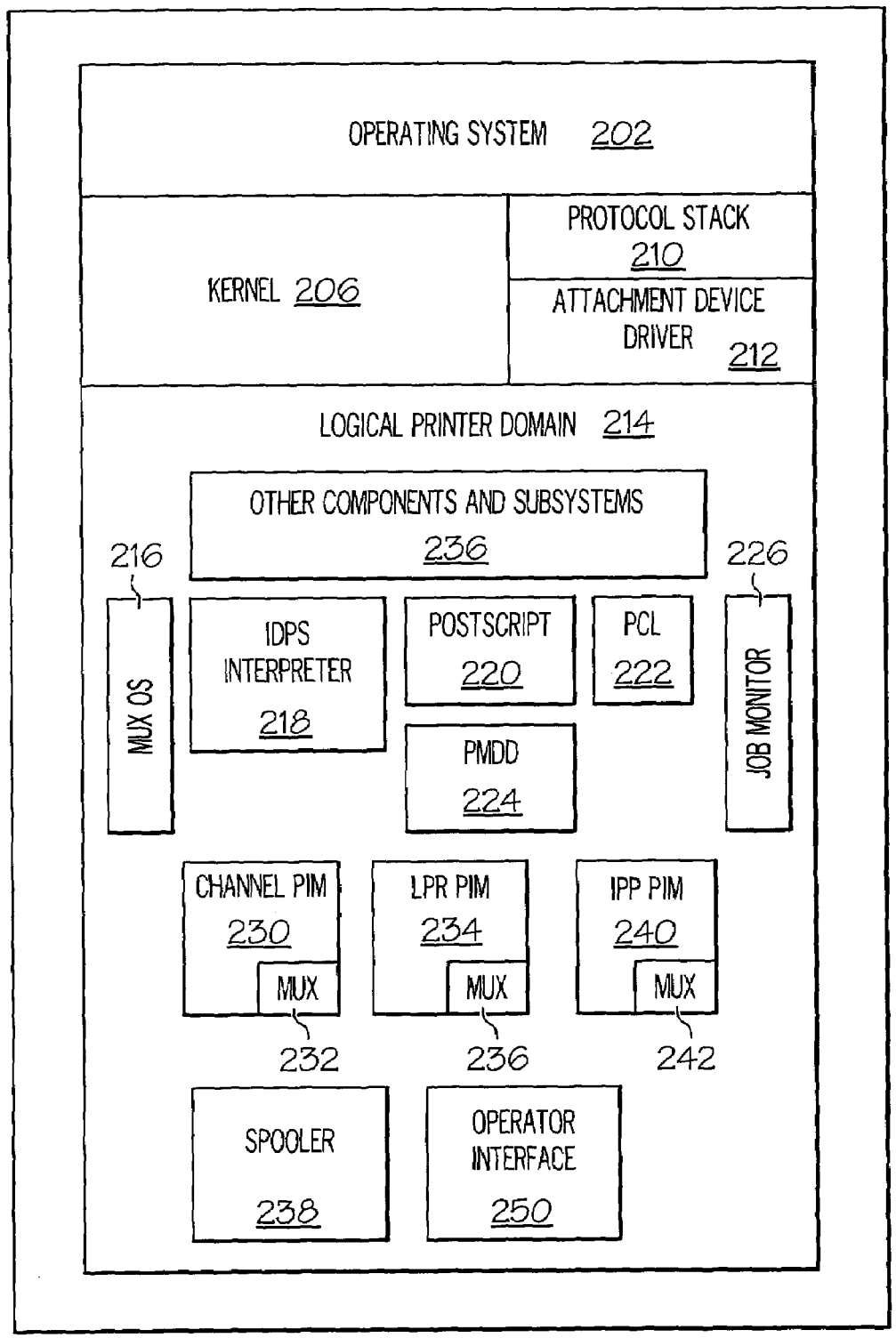
FIG. 2 is a block diagram of exemplary contents of the system memory as depicted in FIG. 1 according to a preferred embodiment of the present invention.

Referring now to the figures, and in particular, referring now to FIG. 1, there is illustrated a block diagram depicting an exemplary data processing system 100 in which a preferred embodiment of the present invention may be implemented. As illustrated, data processing system 100 includes a collection of processing units 102*a-n*, which are coupled by system interconnect 104. System memory 106, discussed later in more detail in conjunction with FIG. 2, is also coupled to processing units 102*a-n* via system interconnect 104. Mezzanine interconnect 108 couples system interconnect 104 with peripheral interconnect 110. Peripheral interconnect 110 may be implemented by a Peripheral Component Interconnect (PCI) bus, Accelerated Graphics Port (AGP) bus, or any other type of peripheral interconnect. Coupled to peripheral interconnect 110 are hard disk drive (HDD) 112, utilized for mass storage capacity, print engine 114, and other peripherals 116*a-n*.

Those of ordinary skill in the art will appreciate that the hardware illustrated in FIG. 1 may vary depending on implementation. Other internal hardware or peripheral devices, such as flash read-only memory (ROM), equivalent non-volatile memory, or optical disk drives and the like, may be used in addition to or in place of the hardware depicted in FIG. 1.

For example, data processing system 100, if optionally configured as a network computer, may not include hard disk drive 112. In this case, the computer, to be properly called a client computer, includes some type of network communication interface, such as a local area network (LAN) adapter, modem, or any other type of communication interface. As another example, data processing system 100 may be a stand-alone system configured to be bootable without relying on some type of network communication interface, whether or not data processing system 100 includes some type of network communication interface. As a further example, data processing system 100 may be a personal digital assistant (PDA), which is configured with ROM and/or flash ROM to provide non-volatile memory for storing operating system files and/or user-generated data.

The depicted example in FIG. 1 and above-described examples are not meant to imply architectural limitations. For example, data processing system 100 also may be a notebook computer, hand-held computer, a personal digital assistant (PDA), a kiosk, or a web appliance.

Referring now to FIG. 2, there is illustrated a block diagram depicting exemplary contents of system memory 106 according to a preferred embodiment of the present invention. As illustrated in FIG. 2, Operating System 202 includes Kernel 206, which includes lower levels of functionality for Operating System 202. These lower levels of functionality include essential services required by other parts of Operating System 202, such as memory management, process and task management, disk management, mouse and keyboard management, and other services required to support the Logical Printer Domain 214, its Component Programs and Subsystems 236, and other essential elements within Logical Printer Domain 214.

Kernel 206 includes protocol stack 210, attachment device driver 212. Protocol stack 210 is software that handles a specific protocol such as Transmission Control Protocol/Internet Protocol (TCP/IP) or Internet Packet Exchange/Sequenced Packet Exchange (IPX/SPX). Attachment device driver 212 is preferably software that interfaces a specific hardware attachment (e.g., channel, Ethernet, etc.) to other system components.

Logical printer domain 214 includes a collection of software components that pertain to the operation and control of a printer, including print engine 114. These software components include Mux OS 216, Intelligent Printer Data Stream (IPDS) interpreter 218, postscript 220, Printer Command Language (PCL) module 222, PDL/Mux Data Delivery (PMDD) 224, Job Monitor 226, Channel Protocol Interface Module (PIM) 230 (with Mux 232), Line Printer Requester (LPR) PIM 234 (with Mux 236), Internet Port Protocol (IPP) PIM 240 (with Mux 242), Spooler 238, other components and subsystems 236, and Operator Interface 250.

As illustrated, logical printer domain 214 includes a collection of Protocol Interface Modules (PIM): Channel PIM 230 (with Mux 232), Line Printer Requester (LPR) PIM 234 (with Mux 236), and Internet Port Protocol (IPP) PIM 240 (with Mux 242). Each PIM is a software component that is designed to handle a specific transmission protocol. A different PIM is utilized to handle each of the supported protocols (e.g., the LPR, File Transfer Protocol (FTP), and Parallel channel protocols are each handled by different PIMs). A PIM receives print data from a client system and delivers the print data, free of transmission protocol elements, to a data sink. The exact data sink is unknown to the PIM. The actual data sinks are Intelligent Printer Data Stream (IPDS) interpreter 218, PMDD 224, and Spooler 238. PIMs that deal with a bi-directional protocol also handle backchannel data that may be generated by an upper-level component (e.g., a Print Data Language (PDL) interpreter). Some PIMs are designed to service multiple concurrent connection requests. Other PIMs queue multiple connection requests and process them one at a time. Generally, PIMs received print job data from an external source and deliver the data to an internal data sink by calling the Multiplexor (Mux) component (e.g., mux 232, 236, and 242). Received data is packed in Logical Channel Blocks (LCBs) prior to calling the Mux. The packaging of incoming data into LCBs may be done by PIMs, or by a lower level component.

A "Mux" (e.g., mux 232, 236, and 242) is a software component that is called by a PIM to deliver data to a data sink and is controlled by MuxOS 216. The Mux determines what data sink will be utilized for the job, and delivers the data to the selected data sink. As depicted in FIG. 2, there are three data sinks in a preferred embodiment of the present invention: IPDS interpreter 218, PMDD 224 (a component that provides data to the ASCII interpreters (e.g., PCL, etc.), and Spooler 238. The Mux determines the data sink for the job based on a number of parameters. These parameters include: the specific PIM called, the content of the job, and the state of the path to the print engine and the state of the spooling system.

For example, certain PIMs carry a data stream (IPDS) that always requires a direct connection between the transmitting client application and the print engine. The data sink for these PIMs is always the IPDS interpreter.

In a different example, e-mail jobs are always spooled so that the body of the job can be printed in its entirety before any attachments. The data sink for the E-mail PIM is always the spooler. In yet another example, a print job received over a raw port (port 2501 or 9100) could be directed to either PMDD 224, or the Spooler 238. In this case, the Mux examines the content of the job and the state of the spooling system to determine the data sink. This examination is sometimes referred to as "sniffing". Mux sniffing examines the job for content such as a PDF file, a microcode update file, a job that includes a job ticket, send and save attributes, etc. The Mux also performs a "traffic control" function for jobs. Preferably jobs are fed to PMDD 224 one at a time and a predetermined n number of jobs may be spooled at a time. These limits are enforced by the Mux. The Mux includes library routines that are called by the various PIMs, as well as separate Mux process that communicates through messages.

A "data sink" is a component that receives print job data that is processed by a PIM. As illustrated in FIG. 2, available data sinks are IPDS interpreter, PMDD 224, and spooler 238. Print job data is delivered to a data sink by the Mux. The data may be placed on a data queue for subsequent processing by the sink (e.g., IPDS), or the data may be passed to the data sink through a function call (e.g., spooler 238).

A "PDL/Mux Data Delivery" (PMDD) 224 is a component responsible for receiving ASCII print job data from a PIM, determining the proper Page Description Language (PDL) to process the data, and delivering the data to the selected PDL. The determination is made by examining the data, which is referred to as "PMDD sniffing". A single job may contain a combination of PostScript (processed by postscript 220), PCL, or Printer Job Language (PJL) data. Data that is not identified as one of these types is processed by PCL interpreter 222.

Job monitor 226 is a software component that is the central repository and knowledge base for job status. For example, some preferable purposes of job monitor 226 include:

(1) Managing and monitoring the flow of print jobs through the system.

(2) Maintaining many different kinds of job and document information about every print job in the system. The information can be queried by any interested component. The information is set either through explicit calls to job monitor 226, or through job monitor 226 setting the values based on other information or events.

(3) Providing a job event mechanism that allows callers to register to get messages sent to them when certain job events occur. This mechanism requires that components that are to receive notification of events first register with job monitor 226 for the proper category of notification.

(4) Coordinating cancellation of a job in the system.

(5) Providing a central repository of information that implements the Printer Working Group Semantic Model (PWGSM), which is an industry standard that provides a generic semantic model of the printing process. This repository includes a hierarchy of objects (e.g., Printer, Job, Document) and allows implementation of attributes of those objects. Any component in the system that is based on the PWGSM will be able to utilize job monitor 226 as a repository of Printer, Job, and Document information.

Figure 3:
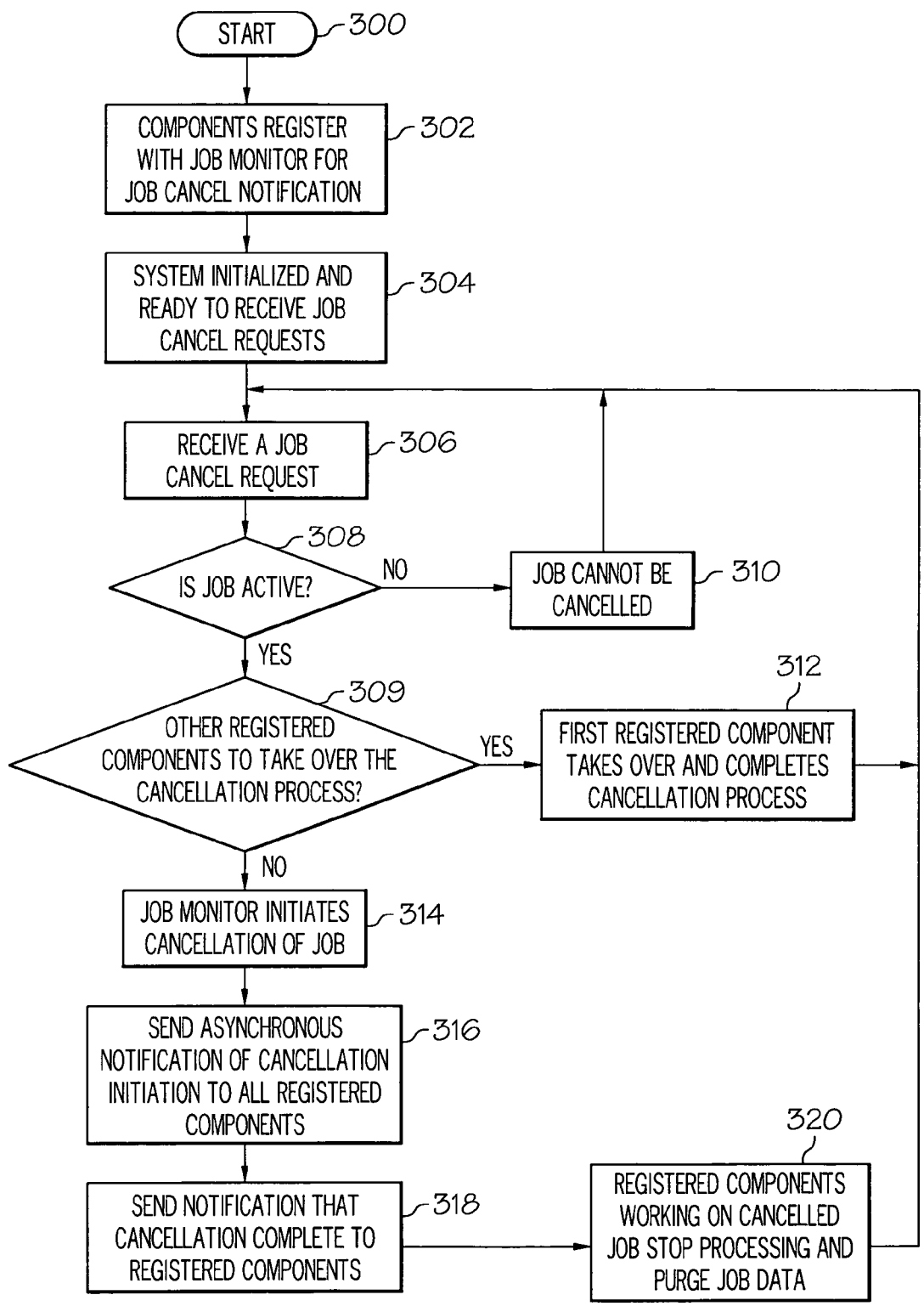
FIG. 3 is a high-level logical flowchart diagram illustrating an exemplary method of implementing a job cancel broadcast notification and parallel processing of the request according to a preferred embodiment of the present invention.

FIG. 3 is a high-level logical flowchart diagram illustrating an exemplary method of job cancel by broadcast notification and parallel processing of request according to a preferred embodiment of the present invention. As illustrated, the process begins at step 300 and proceeds to steps 302-304, which depict system startup or component initialization. In a preferred embodiment of the present invention, components that play a part in the cancel process register with job monitor 226 to received an asynchronous Job Cancel message when a job is cancelled. To register, a component will send a JOB_CANCEL_STEP1_REG_MSG or JOB_CANCEL_STEP2_REG_MSG message to job monitor 226. Processing continues as illustrated by step 304 where the system completes initialization and reaches a normal operating state.

The process proceeds to step 306, which depicts a job cancel process received by job monitor 226 from a software component within system memory 106 (e.g., Operator Interface 250, PMDD 224, or PIMs 230, 234, or 240, etc.).

The process continues to step 308, which depicts job monitor 226 determining whether the job requested to be cancelled is an active job. In this context, an "active job" is a job that is found in the system and is not in the "completed", "cancelled", or "aborted" states. If the job requested to be cancelled is not "active", the process transitions to step 310, which illustrates job monitor 226 determining that the job cannot be cancelled. The process returns to step 306 and proceeds in an iterative fashion.

However, if the job requested to be cancelled is "active", the process continues to step 309, which illustrates job monitor 226 determining if there are registered components to take over the cancellation process. In a preferred embodiment of the present invention, job monitor 226 sends as JOB_CANCEL_TAKEOVER_CMD message to components in the system that have registered to have messages sent to them when a job cancellation is requested. Registered components are components that have the power to control the job cancellation process for a particular protocol or interface and do not want job monitor 226 to be involved in the cancellation.

For example, if an IPDS job is to be cancelled, the cancellation must be handled through IPDS interpreter 218, not job monitor 226. When IPDS interpreter 218 is notified of a cancel and the job to be cancelled is an active IPDS job, IPDS interpreter 218 takes control of the cancel process. If the job being cancelled is not an active IPDS job, IPDS interpreter 218 declines to take control.

If a registered component decides to take over the cancellation process, the process continues to step 312, which illustrates a first registered component taking over and completing the cancellation process. The process returns to step 306 and proceeds in an iterative fashion.

In a preferred embodiment of the present invention, if a component takes over the cancellation process, the component includes a "cancel return code" in the JOB_CANCEL_TAKEOVER_RSP (job cancellation take over response) message. Any component that takes over the cancellation process must not respond with the JOB_CANCEL_TAKEOVER_RSP until the component has finished cancellation processing for the job. It is not required that all sheets of the job that will stack have stacked, or that absolutely all processing of the job has finished (e.g., there might still be some data sitting unread in a queue), but all processing that can be done should be finished, no more transmission of job data should occur between any components, and no further printing of the job should occur.

Returning to step 309, if there are no registered components to take over the cancellation process, the process continues to step 314, which illustrates job monitor 226 initiating cancellation of the job. The process continues to step 316, which depicts job monitor 226 sending out an asynchronous notification message to all registered components.

Upon receiving notification from job monitor 226, components that are actively processing the job being cancelled terminate their job processing as appropriate for the component and then report their completion status to job monitor 226. Based on the received responses, when the cancellation process is complete, job monitor 226 sends out a notification to components that are registered for Job Cancellation Complete notification to indicate that the job cancellation is complete (step 318). Registered components will only receive job cancellation messages of the type of which they are registered. Note that job monitor 226 makes no attempt to determine which components require a Job Cancel message. Job monitor 226 simply sends the job cancel message to every registered component that is registered to receive this message. In this way, each component is responsible to determining its need for Job Cancel notification and registering for this category of notification as appropriate.

The process proceeds to step 320, which illustrates the registered components that are working on the cancelled job stop processing and purge their queues of data related to the cancelled job. The process returns to step 306 and proceeds in an iterative fashion. In a preferred embodiment of the present invention, each notified component acts on the asynchronous Job Cancel message. The processing of the cancelled job within each component depends on the state of the job within the component at the time the job cancel message is received.

Job State 1: Job Cancel Processing of a Non-Active Job

This state occurs when the component has no direct knowledge of the job. This is the state of the job when the first data block for the job has not yet reached the component, or when the component has previously processed the last block of the job. In this state, the component simply ignores the Job Cancel message since the component does not have any actions to perform.

Job State 2: Job Cancel Processing at the Beginning of a Job

Some components, but not all, hold some internal data as a normal part of processing of a job. Additionally, most components hold one data block when waiting for a "forward queue full" condition to clear. When a component receives a Job Cancel message, it determines whether it is currently processing the job identified in the cancel message, and if so, if it is holding the first block of data for the job. For example, the component determines if it has passed the first block of data for the job to the next downstream component. If the job is active and the first block has not yet been passed to the next component, and the process is capable of purging the data for the first block, the component needs to perform a "beginning-of-the-job" cancel.

After announcing the event, the component purges all internal data for the job it may be holding. No data for the job is passed to the next component. Additionally, the component reads and purges blocks from its input queue up to, and including, the last block.

If the component is holding the first block for the job, but is not able to purge the data, then the component performs a "middle-of-the-job" cancel processing, hereinafter described in more detail. For example, the case where a component cannot purge the data applies to PIMs because PIMs have no knowledge of the data that may be held by the Mux at the beginning of the job.

State 3: Job Cancel Processing in the Middle of the Job

"Middle-of-the-job" processing is defined to occur when the following conditions are true at the time that the Job Cancel message is received by the component:

(1) one ore more data blocks for the job have been passed to the next component. This condition means that the next component is aware of the job (or will eventually be aware of it if the first block of the job is still in the next component's input queue); and (2) the last block for the job has not been passed to the downstream component.

When these conditions are true, then the component has some work to do to cancel the job. The work that must be done differs depending on the component. Generally, the component must receive and purge all remaining incoming data blocks for the job. It is possible that the input queue for the component will reach an empty state before the last block is received.

When a data block marked as the last block is received, either that block, or a generated data block marked as the last block is passed to the downstream component. The last block that is passed downstream is set to indicate that it contains no print data for the job.

As discussed, the present invention includes a method, apparatus, and computer-usable medium for registering a collection of components with a job monitor for job cancellation notification, wherein the collection of components are software components within a logical printer domain; receiving a job cancel request; initiating cancellation of a job corresponding to said job cancel request; sending the job cancellation notification to the collection of registered components; and in response to receiving the job cancellation notification, stopping processing of the job and purging data related to the job by said plurality of registered components.

What is claimed is:

1. A method comprising:
    registering a plurality of components with a job monitor for job cancellation notification, wherein said plurality of components are software components within a logical printer domain;
    receiving a job cancel request;
    initiating cancellation of a job corresponding to said job cancel request;
    sending said job cancellation notification to said plurality of registered components; and
    in response to receiving said job cancellation notification, stopping processing of said job and purging data related to said job by said plurality of registered components.

2. The method according to claim 1, further comprising:
    determining whether said job is an active job;
    in response to determining said job is an active job, determining if at least one of said plurality of components request takeover of said cancellation of said job; and
    in response to determining at least one of said plurality of components request takeover of said cancellation of said job, said at least one of said plurality of components completes said cancellation of said job.

3. The method according to claim 1, further comprising:
    sending an asynchronous job cancellation initiation notification to said plurality of components.

4. A system comprising:
    a processor;
    a data bus coupled to said processor; and
    a computer-usable medium embodying computer program code, said computer-usable medium being coupled to said data bus, said computer program code comprising instructions executable by said processor and configured for:
        registering a plurality of components with a job monitor for job cancellation notification, wherein said plurality of components are software components within a logical printer domain;
        receiving a job cancel request;
        initiating cancellation of a job corresponding to said job cancel request;
        sending said job cancellation notification to said plurality of registered components; and
        in response to receiving said job cancellation notification, stopping processing of said job and purging data related to said job by said plurality of registered components.

5. The system according to claim 4, wherein said instructions are further configured for:
    determining whether said job is an active job;
    in response to determining said job is an active job, determining if at least one of said plurality of components request takeover of said cancellation of said job; and
    in response to determining at least one of said plurality of components request takeover of said cancellation of said job, said at least one of said plurality of components completes said cancellation of said job.

6. The system according to claim 4, wherein said instructions are further configured for:
    sending an asynchronous job cancellation initiation notification to said plurality of components.

7. A computer-usable medium embodying computer program code, said computer program code comprising computer executable instructions configured for:
    registering a plurality of components with a job monitor for job cancellation notification, wherein said plurality of components are software components within a logical printer domain;
    receiving a job cancel request;
    initiating cancellation of a job corresponding to said job cancel request;
    sending said job cancellation notification to said plurality of registered components; and
    in response to receiving said job cancellation notification, stopping processing of said job and purging data related to said job by said plurality of registered components.

8. The computer-usable medium according to claim 7, wherein said embodied computer program code further comprises executable instructions configured for:
    sending an asynchronous job cancellation initiation notification to said plurality of components.

* * * * *